United States Patent [19]

Maynard, Jr.

[11] Patent Number: 4,823,947
[45] Date of Patent: Apr. 25, 1989

[54] DEVICE FOR PACKAGING, STORING AND DISPOSING OF OIL AND OTHER PRODUCTS

[76] Inventor: Walter P. Maynard, Jr., 1215 Hightower Trail, Atlanta, Ga. 30338

[21] Appl. No.: 124,345

[22] Filed: Nov. 20, 1987

Related U.S. Application Data

[63] Continuation of Ser. No. 892,348, Aug. 1, 1986, abandoned.

[51] Int. Cl.$^4$ .............................................. B65D 81/36
[52] U.S. Cl. ................................... 206/223; 220/304; 220/1 C; 141/98; 184/1.5
[58] Field of Search ......... 206/223; 220/1 C, DIG. 6; 184/1.5, 106; 141/98, 104, 248, 334, 286

[56] References Cited

U.S. PATENT DOCUMENTS

| Re. 27,449 | 8/1972 | Bartz | 220/1 C |
| 1,554,589 | 9/1925 | Long | 184/1.5 |
| 3,942,677 | 3/1976 | Hagen et al. | 220/304 |
| 4,022,257 | 5/1977 | O'Connell | 184/106 |
| 4,099,598 | 7/1978 | Clinard | 184/106 |
| 4,114,644 | 9/1978 | Piper | 220/1 C |
| 4,149,575 | 4/1979 | Fisher | 141/98 |
| 4,296,838 | 10/1981 | Cohen | 220/1 C |
| 4,301,841 | 11/1981 | Sandow | 184/106 X |
| 4,360,046 | 11/1982 | Streit et al. | 141/98 |
| 4,403,692 | 9/1983 | Pollacco | 184/106 |
| 4,460,104 | 7/1984 | Kitsukawa | 220/304 |
| 4,488,584 | 12/1984 | Hestehare et al. | 206/223 |
| 4,513,865 | 4/1985 | Melzi et al. | 220/1 C |
| 4,533,042 | 8/1985 | Pollaco | 220/1 C |
| 4,632,268 | 12/1986 | Melzi et al. | 220/1 C |

FOREIGN PATENT DOCUMENTS 2536149 5/1984 France .................. 184/1.5

Primary Examiner—William Price
Attorney, Agent, or Firm—Needle & Rosenberg

[57] ABSTRACT

A device for packaging, collecting, storing and disposing of oil and other products comprising a container having a large, sealable opening for collecting products, preferably liquids, on one side, and a smaller sealable opening for pouring products, preferably liquids, on another. The device is to be of sufficient size and shape to allow for placement under the machine from which liquid is collected. The collection opening is of sufficient size to allow relatively large objects, such as an oil filter, into the device without adding dirt to the exposed surfaces of the device. A filter may also be provided for in the region occupied by the collection opening so that liquids can be filtered as they enter the device. The collection opening may be internally sealed with a removable covering so that the container can be used for the distribution and sales of a liquid product contained therein.

16 Claims, 2 Drawing Sheets

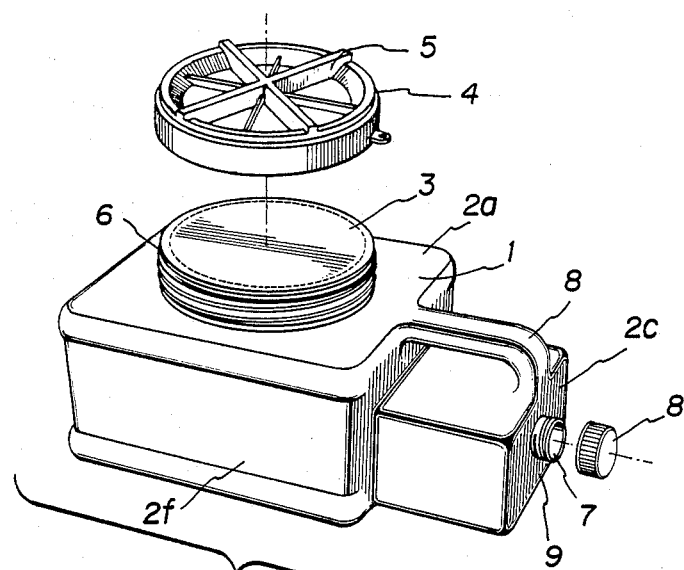
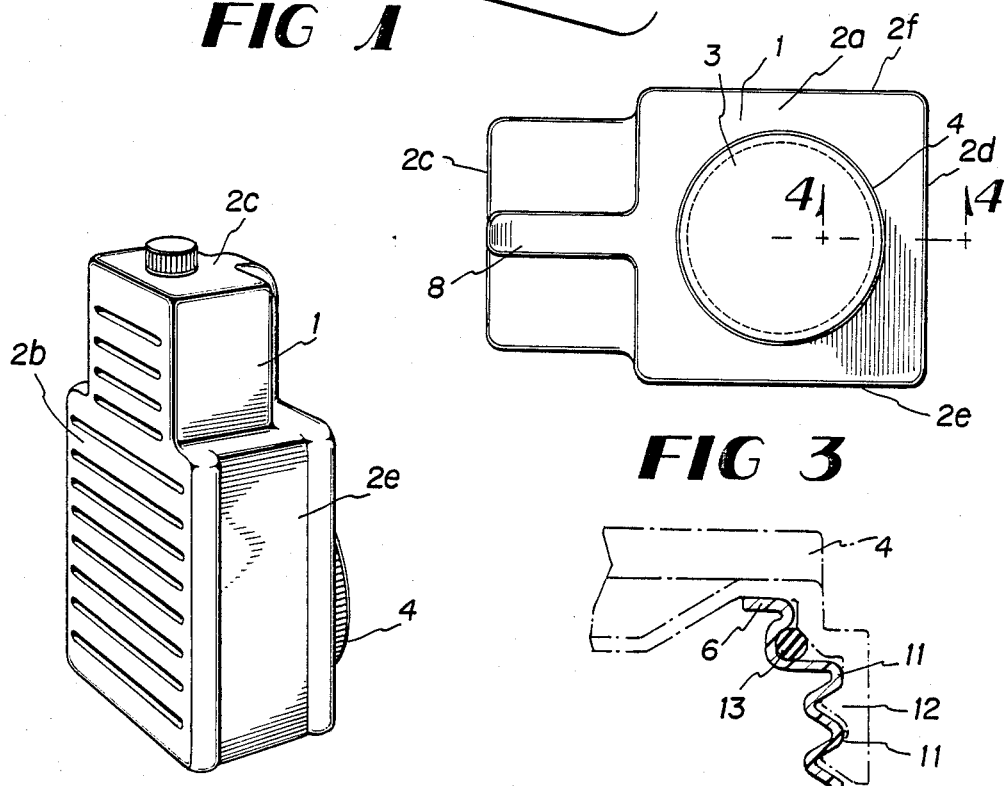

DEVICE FOR PACKAGING, STORING AND DISPOSING OF OIL AND OTHER PRODUCTS

This application is a continuation, of application Ser. No. 06/892,348, filed 8/01/86, and now abandoned.

BACKGROUND OF THE INVENTION

This invention pertains to a device for packaging, collecting, storing, and disposing oil and other products, particularly liquids, and particularly to a device which has a large opening on one of its broad sides so as to facilitate the collection of a product into the device, a smaller opening on a second-side so as to facilitate removal of the product from the device, and sealing means capable of covering both openings so that the product can be stored and transported easily in the device.

The use of containers for storing products, particularly liquids, is well known. Quite often, these containers have a means for facilitating removal of the contents. For example, a relatively recent trend is the sale of motor oil for automobiles in plastic containers with the top portion tapered towards a small opening designed for easy pouring. This opening is often sealable by a screw-on type cap. The use of containers for collecting liquids is also well known. Large drainpans are commonly used to collect oil and antifreeze drained from automobiles and other machinery. The only requirements for such a collection device is that it have an opening large enough to allow liquids to enter the device without spilling, and that it be of size to fit below the thing from which liquid is removed.

A problem arises, however, from the fact that an opening which is of a small enough size to facilitate pouring is often too small for proper collection of liquid. For example, the motor oil container described above provides easy pouring of oil into the automobile, but, unless a funnel is used, it cannot be properly used to collect and store oil drained from the vehicle.

Recently, federal, state and local laws have imposed requirements that waste oil, such as that periodically removed from an automobile or other machinery, be disposed of in an environmentally safe manner. This is in an attempt, among other things, to prevent the leaching of waste oil into the groundwater. For example, many laws require that waste oil be disposed of at service stations or other designated disposal sites. This means that after collection waste oil has to be stored and transported to such site. It has become necessary, therefore, in light of the limitations above, to collect the oil in one container and physically transfer it to another for storage and transport to the disposal site.

Many problems arise peculiar to the collection, storing during transport, and disposing of waste oil. One cause of problems is the high viscosity of oil and its propensity for adhering to surfaces with which it makes contact. Such adhering oil cannot be sufficiently removed by wiping with a cloth, and attempts at rinsing such oil off the surface are largely ineffective and result in further adding to the problems of polluting the groundwater. Even if removal of oil is accomplished by rinsing with water, and assuming a means to prevent groundwater leaching is provided, the proper disposal of the combination rinse and waste oil would be costly and burdensome. A funnel used to facilitate collection into a container with a small opening also must be rinsed clean, as must any container on which a surface contacting oil is exposed, and this adds to the problem of groundwater leaching.

Like oil, anti-freeze is a pollutant to groundwater, and is harmful to those who come into contact with it. It is important, therefore, that it also be collected and transported in as spill-free manner as possible.

There also exists the problem of properly collecting and transporting rinse, drained oil and other liquids which result from cleaning oil filters, small parts, etc. For example, waste solvents such as Trichloroethane and Freon often need to be disposed of in a manner similar as that described above for oil.

There also exists a problem of storing and transporting a large object, such as a dirty oil filter, to a proper disposal site. The discarding of a dirty oil filter in the household garbage results in adding oil to the groundwater.

Therefore, there exists a need for a simple, cost effective device which will allow for efficient collecting, storing, and disposing of waste oil and other products, particularly liquids. A more particular need is for a device which will allow for the easy collection of oil as it is drained from an automobile, the ability to seal such device so that it can cleanly contain the waste oil as it is transported to the waste disposal site, and the easy pouring of the contents once there. It is especially important that these steps be performed without oil contacting and adhering to the side of the container, and without spillage of the waste oil.

SUMMARY OF THE INVENTION

The object of the present invention is to provide a device which allows for collecting oil or other products, particularly liquids, for storing the collected product, and for disposing the collected product all in one container and without spillage or contact of such to an exposed surface of the container. To this end, the invention provides a device comprising a container having a large collection opening on one of its sides, and a smaller opening on another. Each such opening is sealable, for example, with a threaded screw-on cap, to allow containment of the product inside the device during transport without spillage. The collection opening is large enough to facilitate the collection of a product or products directly into the device and, in the case of a liquid or powder, without the need for a funnel. This provides clean storage and transport of an object, i.e., waste oil or a dirty oil filter, inside the device. This is made possible by the collection opening being of sufficient size to allow entry and removal of the object through the walls of the container. In particular, there is no contact between the product and the outside of the device.

The pour opening is sufficiently small enough and located such as to provide for easy removal of fluid contents of the device. A handle may be provided to facilitate pouring. This will allow for proper disposal of the contents without dirtying, and without loss or spillage. Because the outside does not come in contact with the contents of the device, cleaning is kept to a minimum.

A further object is to provide a means for catching drain plugs and other objects while liquid is being collected into the device for storage and disposal. This can be achieved by placing a basket in the region of the large opening, so that the object enters the basket and not the container. A disposable filter may be used to collect smaller sized objects.

A further object is to provide a device which can hold a filter or small parts during cleaning so that the rinse is collected directly into the container used for transport.

It is a still further object of the invention to provide a device which can be used for the collection, transportation, and disposal of liquids, and which can initially be used as a container in which to sell fresh liquid products. This may be accomplished by initially covering the large collection opening with plastic or a foil, such as aluminum, so as to securely contain the fresh product under all conditions without leakage. After the fresh products are removed from the container through the opening for pouring fluids, the user removes the initial plastic or foil cover over the collection opening. The device which was used as a packaging container for holding the fresh product during an initial sale or distribution can now be reused as a device for collecting, storing and disposing waste products. The device, when sold as a packaging container, may entail all the elements (i.e., o-ring, catch-all basket) necessary for using the device for collecting, storing and disposing of waste products. This will result in cost savings to consumers, reduced need for raw materials, and a reduction in waste containers which, when disposed of as everyday household garbage, add oil or other liquids to the groundwater

BRIEF DESCRIPTION OF THE DRAWINGS

FIG. 1 shows a three-quarter view of the device.
FIG. 2 shows a three quarter view of the device.
FIG. 3 shows a top view of the device.
FIG. 4 shows a cross sectional view of a portion of the screw-on cap type sealing device and accepting means.

DETAILED DESCRIPTION OF THE DRAWINGS

Figure 5:
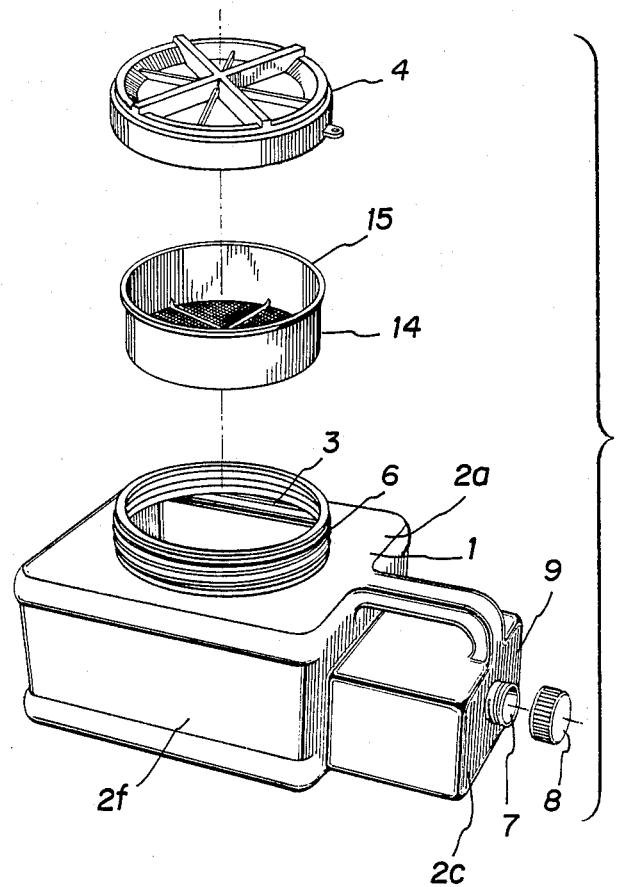
FIG. 5 shows a three-quarter view of the device as it is used with a catch-all basket.

FIGS. 1, 2 and 3 show the invention in a preferred embodiment. A container 1 consisting substantially of 6 sides 2a, 2b, 2c, 2d, 2e and 2f is provided so as to hold oil or another object without leakage. The container has a relatively large opening for collecting objects 3 on one of its sides, preferably a broad side 2a. This collection opening 3 is to be of a size sufficient to allow placement of liquids, as well as relatively large sized objects, such as oil filters, into the container 1 without spillage or contact with the container's sides 2a-f.

The collection opening 3 is sealable so that the contents inside the container 1 cannot leak out. The sealing may be accomplished by using a screw-on cap type sealing device 4, which is placed and rotated upon a threaded means 6 for accepting a screw-on cap 4. The screw-on cap 4 may have on it means for facilitating rotation 5, so as to enhance the gripping of the cap 4. The means for accepting a screw-on cap 4 may, as shown in FIG. 4, contain a non-corrosive O-ring 13. The O-ring 13 sits within a groove surrounding the opening 3, and, when the screw-on cap 4 is applied, the O-ring contacts both the screw-on cap 4 and the accepting means 6, thereby enhancing the seal.

An opening 7 for pouring liquids and other relatively small sized objects is located on the side of the container 1, preferably on a side perpendicular to the side containing the collection opening 3. This opening 7 is of a size which provides for easy pouring of the contents of the container 1. This pour opening 7 is also sealable, and this can best be accomplished with a screw-on cap type sealing device 8 similar to that described above for the collection opening. The threaded means for accepting the screw-on cap of the pour opening 9 also acts as a spout to enhance control of the pouring of the liquid. A handle 8 may be provided, preferably located between the two openings, to further aid in carrying and pouring from the container 1.

The sides of the container 1 may be tapered or narrowed so that the side 2c having the pour opening 7 has less surface area than the side parallel to it. This will aid in flow from the container 1, as well as enhance handling. The side 2b opposite the collection opening 3 may be corrugated to provide greater support to the container.

Figure 6:
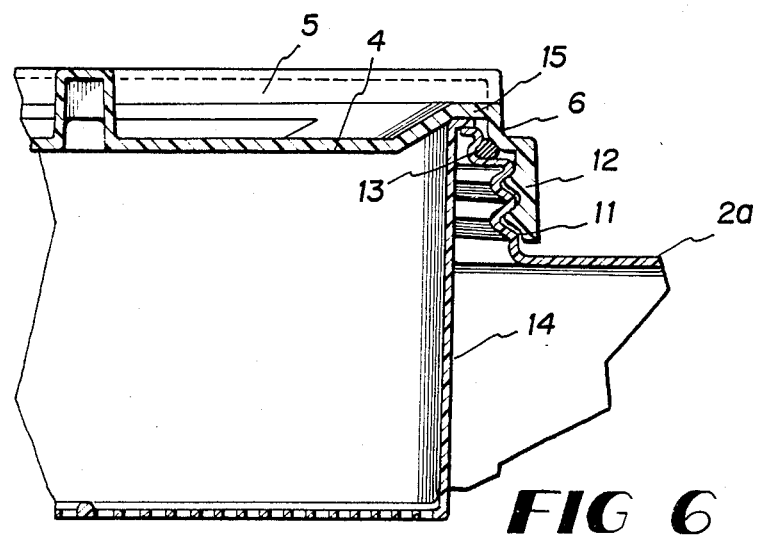
FIG. 6 is a cross sectional view of a portion of a portion of the screw-on cap type sealing device and accepting means with a catch-all basket attached.

FIG. 5 shows the invention as it is used with a removable catch-all basket 14. This basket 14 is placed in the area occupied by the collection opening 3. A lip 15 circling along the top of the basket 14 protrudes an amount sufficient to support the basket 14 by contacting with and resting upon the upper portion of the screw-on cap accepting means 6 so that the basket extends into the container, as illustrated in FIG. 6. This basket 14 may be used to catch a dropped drain plug before it can enter the container 1. Also, a dirty filter may be rested in the basket 14 and can be cleaned so that rinse and drained oil or other liquid will directly enter the container 1. The dirty filter itself can be stored in the device until properly disposed. A third advantage of the basket 14 is that it will hold small parts, such as nuts and bolts, so that they can be degreased or otherwise cleaned by rinsing with a solvent, such as 1, 1, 1-Trichloroethane or Freon. The rinse can be collected and cleanly transported to a disposal site in a single device. A disposable filter may be placed within the basket 14 to provide removal of small particles from a liquid being collected. As shown in FIG. 6, the length of the threads 12 of the screw-on cap 4 and the threads 11 of the screw-on cap accepting means 6 can be of a size sufficient to allow the proper sealing of the collection opening 3 with a screw-on cap 4 without removing the filter basket 14 and filter. This allows for clean transport of the basket 14 and dirty filter.

The collection opening 3 may be covered with a removable cover so as to allow objects, including liquids, to be sold in the device without the problem of leakage. This covering may be accomplished by securing a thin, removable, foil around the top of the means for accepting a screw-on cap type sealing device 6, or by molding a plastic covering over the collection opening 3 which can be removed by the eventual user as desired. Such a covering will also prevent unscrupulous individuals from shoplifting by prohibiting the placing of objects within the device before sale.

What I claim is:
1. A device for packaging, collecting, storing, and disposing of oil and other products comprising:
   (a) a container having a collection opening of comparatively large size for collecting products without the use of funneling means, the opening being of such size as is sufficient to allow entry of product into said container without contact with the exposed surfaces of said device, said collection opening formed by means of a neck upwardly projecting from said container;

(b) a collection basket having a body portion capable of extending through said collection opening into said container;

(c) means for selectively maintaining said body portion within said collection opening;

(d) a sealing cap capable of sealingly engaging with said neck;

(e) a pour opening for pouring products from said device; and (f) a handle positioned along the longitudinal axis of said container between said collection opening and said pour opening.

2. A device as described in claim 1 and further comprising elongated sides capable of having said collection opening, and narrow sides capable of allowing said device to be fitted beneath a machine from which product is to be collected.

3. A device as described in claim 1 wherein said catch-all basket is removable from said device.

4. A device as described in claim 3 wherein the opening for collecting products is of sufficient size to allow passage of a relatively large object through the side of the container.

5. A device as described in claim 1 wherein said collection opening is further internally sealed with a removable covering such that the device may be initially used as a container for the distribution of a product contained therein.

6. The device of claim 1, wherein said maintaining means includes an upper portion inwardly projecting from the top of said neck and a lip outwardly projecting from body portion, said upper portion and said lip being in alignment with each other and wherein the underside of said cap includes a surface which engages the top of said basket lip to maintain said basket in said collection opening while preventing leakage of product through said collection opening.

7. The device of claim 1, wherein said neck has threads and said underside of said sealing cap has threads matingly corresponding to those of said neck so that said sealing cap and said neck may be threadingly engaged together.

8. The device of claim 1, and further comprising an O-ring surrounding said neck and a complimentary surface located on the underside of said sealing cap for directing pressure onto said O-ring to enhance the quality of seal when said cap and said neck are engaged.

9. The device of claim 3, wherein said neck has an O-ring groove along its circumference and said O-ring is held in place in said O-ring groove.

10. The device of claim 1, wherein said basket has screening means for catching objects larger than a predetermined size while permitting objects smaller than said predetermined size to pass into said container.

11. The device of claim 10, wherein said screening means is comprised of a screen located on the bottom of said basket.

12. The device of claim 1, wherein the body portion of said basket is of a depth so as to hold therein an object approximating the size of an automobile oil filter while enabling said sealing cap to be sealingly engaged to said neck.

13. The device of claim 1, wherein said collection opening is of size sufficient to allow an object the size of an automobile oil filter to be passed therethrough into said container.

14. A device for packaging, collecting, storing and disposing oil and other products comprising:

(a) a container comprising:

(1) a rear-body portion having a collection opening collecting products thereon;

(2) a front-body portion integrally formed with and in flow communication with said rear-body portion, said front-body portion being of a size smaller than said rear-body portion and having a pour opening thereon through which said product may be removed from said container;

(b) means for removably sealing said collection opening;

(c) means for removably sealing said pour opening; and (d) a handle positioned along the longitudinal axis of said container between said collection opening and said pour opening.

15. The device of claim 14, and further comprising a collection basket having a body portion capable of extending through said collection opening into said container and means for selectively maintaining said body portion within said collection opening.

16. The device of claim 15, and wherein said basket includes a screen laterally extending across said body portion which allows said product to pass therethrough.

* * * * *